(12) United States Patent
Rawat et al.

(10) Patent No.: US 11,294,946 B2
(45) Date of Patent: Apr. 5, 2022

(54) METHODS AND SYSTEMS FOR GENERATING TEXTUAL SUMMARY FROM TABULAR DATA

(71) Applicant: Tata Consultancy Services Limited, Mumbai (IN)

(72) Inventors: Mrinal Rawat, Gurgaon (IN); Lovekesh Vig, Gurgaon (IN); Amit Sangroya, Gurgaon (IN); Gautam Shroff, Gurgaon (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 17/319,635

(22) Filed: May 13, 2021

(65) Prior Publication Data
US 2021/0357443 A1   Nov. 18, 2021

(30) Foreign Application Priority Data
May 15, 2020   (IN) .............................. 202021020657

(51) Int. Cl.
*G06F 16/34* (2019.01)
*G06N 20/00* (2019.01)
*G06F 40/177* (2020.01)

(52) U.S. Cl.
CPC .......... *G06F 16/345* (2019.01); *G06F 40/177* (2020.01); *G06N 20/00* (2019.01)

(58) Field of Classification Search
CPC ...... G06F 16/345; G06F 40/177; G06N 20/00
See application file for complete search history.

(56) References Cited

U.S. PATENT DOCUMENTS

| | | | | |
|---|---|---|---|---|
| 5,978,820 A | * | 11/1999 | Mase | ............ G06F 40/237 715/260 |
| 7,587,309 B1 | * | 9/2009 | Rohrs | ............ G06F 16/345 715/236 |

(Continued)

OTHER PUBLICATIONS

Puduppully, Ratish et al., "Data-to-Text Generation with Content Selection and Planning", Computation and Language, Apr. 2019, Arxiv, https://arxiv.org/pdf/1809.00582.pdf.

(Continued)

*Primary Examiner* — Keith D Bloomquist
(74) *Attorney, Agent, or Firm* — Finnegan, Henderson, Farabow, Garrett & Dunner LLP

(57) ABSTRACT

This disclosure relates generally to methods and systems for generating a textual summary from a tabular data. During the textual summary generation using conventional end-to-end neural network-based techniques, a numeric data present in the tables is encoded via textual embeddings. However, the textual embeddings cannot reliably encode information about numeric concepts and relationships. The methods and systems generate the textual summary from the tabular data, by incorporating rank information for different records present in the tabular data. Then, a two-stage encoder-decoder network is used to learn correlations between the rank information and the probability of including the records based on the rank information, to obtain the textual summary generation model. The textual summary generation model identifies the content selection having the records present in the tables to be included in the textual summary and generates the textual summary from the identified content selection.

17 Claims, 4 Drawing Sheets

(56) References Cited

U.S. PATENT DOCUMENTS

| | | | |
|---|---|---|---|
| 2004/0154000 A1* | 8/2004 | Kasravi | G06F 11/3608 |
| | | | 717/130 |
| 2004/0225667 A1* | 11/2004 | Hu | G06F 16/345 |
| 2017/0235888 A1* | 8/2017 | Rahman | G16H 10/60 |
| | | | 705/3 |
| 2017/0249289 A1* | 8/2017 | Simske | G06F 16/353 |
| 2018/0039694 A1* | 2/2018 | Beaumont | G06F 40/284 |
| 2019/0171760 A1* | 6/2019 | Ikeda | G10L 15/08 |
| 2020/0185102 A1* | 6/2020 | Leventhal | G06N 20/00 |
| 2020/0202171 A1* | 6/2020 | Hughes | G06F 8/36 |
| 2020/0210490 A1* | 7/2020 | Hutchins | G06F 40/20 |
| 2020/0210521 A1* | 7/2020 | Hutchins | G06N 5/022 |
| 2020/0356729 A1 | 11/2020 | Duan et al. | |
| 2021/0064641 A1* | 3/2021 | Shoeibi | G06F 16/345 |

OTHER PUBLICATIONS

Ma, Shuming et al., "Key Fact as Pivot: A Two-Stage Model for Low Resource Table-to-Text Generation", Computation and Language, Aug. 2019, Arxiv, https://arxiv.org/pdf/1908.03067.pdf.

Chen, Kai et al., "Neural Data-to-Text Generation with Dynamic Content Planning", Computation and Language, Apr. 2019, Arxiv, https://arxiv.org/pdf/2004.07426.pdf.

* cited by examiner

Receiving a plurality of input datasets associated with an event, wherein each input dataset of the plurality of input datasets comprises (i) one or more input tables, and (ii) an input textual summary associated with the one or more input tables, wherein each input table of the one or more input tables present in each input dataset of the plurality of input datasets comprises one or more column names and one or more records, wherein each record of the one or more records comprises an attribute value against each column name of the one or more column names 202

Pre-processing each input dataset to obtain a plurality of pre-processed datasets from the plurality of input datasets, wherein each pre-processed dataset obtained from the input dataset comprises: (i) a pre-processed input table obtained based on the one or more input tables present in the input dataset, and comprises one or more predefined column names and one or more pre-processed records, wherein each pre-processed record of the one or more pre-processed records comprises a pre-processed attribute value against each predefined column name of the one or more predefined column names, and (ii) a pre-processed textual summary table obtained based on the input textual summary present in the input dataset, and comprises one or more predefined textual summary column names and one or more textual summary records, wherein each textual summary record of the one or more textual summary records comprises a textual summary attribute value against each predefined textual summary column name of the one or more predefined textual summary column names 204

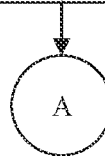

FIG. 2A

METHODS AND SYSTEMS FOR GENERATING TEXTUAL SUMMARY FROM TABULAR DATA

PRIORITY CLAIM

This U.S. patent application claims priority under 35 U.S.C. § 119 to: Indian Patent Application No. 202021020657, filed on 15 May, 2020. The entire contents of the aforementioned application are incorporated herein by reference.

TECHNICAL FIELD

The disclosure herein generally relates to text processing, and, more particularly, to methods and systems for generating a textual summary from a tabular data.

BACKGROUND

Textual summary generation from structured data present in tables (herein after referred as a 'tabular data') is finding prominent applications in automating business processes. A process of textual summary generation from the tabular data is divided into two key sub-tasks including (i) structured content selection from the tabular data and (ii) textual summary generation from the structured content selection. Conventional techniques for the textual summary generation include (i) relying on textual summary generation manually, and (ii) relying on machine learning based models including neural networks.

In the textual summary generation using conventional end-to-end neural network-based techniques, a numeric data present in the tables is encoded via textual embeddings. However, the textual embeddings cannot reliably encode information about numeric concepts and relationships. Moreover, since every numeric value has a unique embedding, generalizing to unseen numeric values by the conventional neural network-based techniques becomes technically challenging. Due to these technical challenges, an accuracy of the textual summary generation may not be encouraging and effective.

SUMMARY

Embodiments of the present disclosure present technological improvements as solutions to one or more of the above-mentioned technical problems recognized by the inventors in conventional systems.

In an aspect, there is provided a processor-implemented method for generating a textual summary from a tabular data, the method comprising the steps of: receiving a plurality of input datasets associated with an event, wherein each input dataset of the plurality of input datasets comprises (i) one or more input tables, and (ii) an input textual summary associated with the one or more input tables, wherein each input table of the one or more input tables present in each input dataset of the plurality of input datasets comprises one or more column names and one or more records, and wherein each record of the one or more records comprises an attribute value against each column name of the one or more column names; pre-processing each input dataset to obtain a plurality of pre-processed datasets from the plurality of input datasets, wherein each pre-processed dataset obtained from the input dataset comprises: (i) a pre-processed input table obtained based on the one or more input tables present in the input dataset, and comprises one or more predefined column names and one or more pre-processed records, wherein each pre-processed record of the one or more pre-processed records comprises a pre-processed attribute value against each predefined column name of the one or more predefined column names, and (ii) a pre-processed textual summary table obtained based on the input textual summary present in the input dataset, and comprises one or more predefined textual summary column names and one or more textual summary records, and wherein each textual summary record of the one or more textual summary records comprises a textual summary attribute value against each predefined textual summary column name of the one or more predefined textual summary column names; dividing randomly, the plurality of pre-processed datasets into: (i) a training dataset, and (ii) a validation dataset, based on a predefined ratio; training a two-stage encoder-decoder network, with one or more pre-processed datasets present in the training dataset, to obtain a textual summary generation model for generating the textual summary from the tabular data, wherein the two-stage encoder-decoder network comprises a first-stage encoder-decoder network and a second-stage encoder-decoder network; validating the textual summary generation model, with the one or more pre-processed datasets present in the validation dataset, to finetune model weights of the textual summary generation model; receiving one or more test tables for which the textual summary is to be generated, wherein each test table of the one or more test tables comprises one or more test column names and one or more test records, wherein each test record of the one or more test records comprises a test attribute value against each test column name of the one or more test column names; pre-processing the one or more test tables, to obtain a pre-processed test table, wherein the pre-processed test table comprises one or more predefined test column names and one or more pre-processed test records, wherein each pre-processed test record of the one or more pre-processed test records comprises a pre-processed test attribute value against each predefined test column name of the one or more predefined test column names; and generating the textual summary for the one or more test tables, by providing the pre-processed test table to the textual summary generation model.

In another aspect, there is provided a system for generating a textual summary from a tabular data, the system comprising: a memory storing instructions; one or more Input/Output (I/O) interfaces; and one or more hardware processors coupled to the memory via the one or more I/O interfaces, wherein the one or more hardware processors are configured by the instructions to: receive a plurality of input datasets associated with an event, wherein each input dataset of the plurality of input datasets comprises (i) one or more input tables, and (ii) an input textual summary associated with the one or more input tables, wherein each input table of the one or more input tables present in each input dataset of the plurality of input datasets comprises one or more column names and one or more records, and wherein each record of the one or more records comprises an attribute value against each column name of the one or more column names; pre-process each input dataset to obtain a plurality of pre-processed datasets from the plurality of input datasets, wherein each pre-processed dataset obtained from the input dataset comprises: (i) a pre-processed input table obtained based on the one or more input tables present in the input dataset, and comprises one or more predefined column names and one or more pre-processed records, wherein each pre-processed record of the one or more pre-processed records comprises a pre-processed attribute value against each predefined column name of the one or more predefined column names, and (ii) a pre-processed textual summary table obtained based on the input textual summary present in the input dataset, and comprises one or more predefined textual summary column names and one or more textual summary records, and wherein each textual summary record of the one or more textual summary records comprises a textual summary attribute value against each predefined textual summary column name of the one or more predefined textual summary column names; dividing randomly the plurality of pre-processed datasets into: (i) a training dataset, and (ii) a validation dataset, based on a predefined ratio; train a two-stage encoder-decoder network, with one or more pre-processed datasets present in the training dataset, to obtain a textual summary generation model for generating the textual summary from the tabular data, wherein the two-stage encoder-decoder network comprises a first-stage encoder-decoder network and a second-stage encoder-decoder network; validate the textual summary generation model, with the one or more pre-processed datasets present in the validation dataset, to finetune model weights of the textual summary generation model; receive one or more test tables for which the textual summary is to be generated, wherein each test table of the one or more test tables comprises one or more test column names and one or more test records, wherein each test record of the one or more test records comprises a test attribute value against each test column name of the one or more test column names; pre-process the one or more test tables, to obtain a pre-processed test table, wherein the pre-processed test table comprises one or more predefined test column names and one or more pre-processed test records, wherein each pre-processed test record of the one or more pre-processed test records comprises a pre-processed test attribute value against each predefined test column name of the one or more predefined test column names; and generate the textual summary for the one or more test tables, by providing the pre-processed test table to the textual summary generation model.

In yet another aspect, there is provided a computer program product comprising a non-transitory computer readable medium having a computer readable program embodied therein, wherein the computer readable program, when executed on a computing device, causes the computing device to: receive a plurality of input datasets associated with an event, wherein each input dataset of the plurality of input datasets comprises (i) one or more input tables, and (ii) an input textual summary associated with the one or more input tables, wherein each input table of the one or more input tables present in each input dataset of the plurality of input datasets comprises one or more column names and one or more records, and wherein each record of the one or more records comprises an attribute value against each column name of the one or more column names; pre-process each input dataset to obtain a plurality of pre-processed datasets from the plurality of input datasets, wherein each pre-processed dataset obtained from the input dataset comprises: (i) a pre-processed input table obtained based on the one or more input tables present in the input dataset, and comprises one or more predefined column names and one or more pre-processed records, wherein each pre-processed record of the one or more pre-processed records comprises a pre-processed attribute value against each predefined column name of the one or more predefined column names, and (ii) a pre-processed textual summary table obtained based on the input textual summary present in the input dataset, and comprises one or more predefined textual summary column names and one or more textual summary records, and wherein each textual summary record of the one or more textual summary records comprises a textual summary attribute value against each predefined textual summary column name of the one or more predefined textual summary column names; dividing randomly the plurality of pre-processed datasets into: (i) a training dataset, and (ii) a validation dataset, based on a predefined ratio; train a two-stage encoder-decoder network, with one or more pre-processed datasets present in the training dataset, to obtain a textual summary generation model for generating the textual summary from the tabular data, wherein the two-stage encoder-decoder network comprises a first-stage encoder-decoder network and a second-stage encoder-decoder network; validate the textual summary generation model, with the one or more pre-processed datasets present in the validation dataset, to finetune model weights of the textual summary generation model; receive one or more test tables for which the textual summary is to be generated, wherein each test table of the one or more test tables comprises one or more test column names and one or more test records, wherein each test record of the one or more test records comprises a test attribute value against each test column name of the one or more test column names; pre-process the one or more test tables, to obtain a pre-processed test table, wherein the pre-processed test table comprises one or more predefined test column names and one or more pre-processed test records, wherein each pre-processed test record of the one or more pre-processed test records comprises a pre-processed test attribute value against each predefined test column name of the one or more predefined test column names; and generate the textual summary for the one or more test tables, by providing the pre-processed test table to the textual summary generation model.

In an embodiment, (i) the one or more predefined column names associated with each pre-processed input table comprises one or more fixed column names and one or more variable column names, wherein the one or more variable column names are defined based on the one or more column names of the one or more input tables present in each input dataset of the plurality of input datasets, and (ii) the one or more pre-processed records associated with each pre-processed input table are defined based on the one or more records of the one or more input tables present in the associated input dataset.

In an embodiment, the one or more fixed column names comprises: (i) value, (ii) entity, (iii) entity type, and (iv) rank.

In an embodiment, the one or more predefined textual summary column names associated with each pre-processed textual summary table are selected from the one or more predefined column names present in the pre-processed input table of the associated pre-processed dataset.

In an embodiment, the pre-processed textual summary table for the input textual summary present in each input dataset of the plurality of input datasets is obtained by using a feature extraction technique.

In an embodiment, training the two-stage encoder-decoder network, with the one or more pre-processed datasets present in the training dataset, to obtain the textual summary generation model, further comprising: performing for each pre-processed dataset at a time, until the one or more pre-processed datasets present in the training dataset are completed: generating a first feature vector for each pre-processed record to obtain one or more first feature vectors for the one or more pre-processed records present in the pre-processed input table, using a set of first embedding layers of the first-stage encoder-decoder network, wherein the first feature vector for each pre-processed record comprises one or more embedding features wherein each embedding feature of the one or more embedding features is associated with a pair of: (i) the predefined column name out of the one or more predefined column names and (ii) the pre-processed attribute value present in the pre-processed record against the predefined column name; concatenating the one or more first feature vectors for the one or more pre-processed records of the pre-processed input table, to obtain a first concatenated feature vector of the pre-processed input table; providing the first concatenated feature vector of the pre-processed input table to a first encoder of the first-stage encoder-decoder network to generate a first context vector of the pre-processed input table; providing the first context vector of the pre-processed input table, to a first decoder with a pointer attention mechanism of the first-stage encoder-decoder network, to generate one or more ordered indices, based on (i) the pre-processed textual summary table corresponding to the pre-processed dataset, and (ii) a fixed column name out of the one or more fixed column names present in the pre-processed input table, wherein the one or more ordered indices represents a subset of pre-processed records out of the one or more pre-processed records present in the pre-processed input table, that are matching with the one or more textual summary records present in the pre-processed textual summary table, based on an order; generating a second feature vector for each pre-processed record to obtain a subset of second feature vectors for the subset of pre-processed records obtained from the first decoder with the pointer attention mechanism of the first-stage encoder-decoder network, using a set of second embedding layers of the second-stage encoder-decoder network, wherein the second feature vector for each pre-processed record comprises one or more embedding features wherein each embedding feature of the one or more embedding features is associated with the pair of: (i) the predefined column name out of the one or more predefined column names and (ii) the pre-processed attribute value present in each pre-processed record of the subset of pre-processed records, against the predefined column name; concatenating the subset of second feature vectors for the subset of pre-processed records, to obtain a second concatenated feature vector of the subset of pre-processed records; providing the second concatenated feature vector of the subset of pre-processed records to a second encoder of the second-stage encoder-decoder network to generate a second context vector for the subset of pre-processed records; and providing the second context vector for the subset of pre-processed records, to a second decoder network with the pointer attention mechanism of the second-stage encoder-decoder, to generate the textual summary, using (i) a natural language processing technique, and (ii) a copy generation mechanism.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2A and FIG. 2B illustrate exemplary flow diagrams of the processor-implemented method for generating the textual summary from the tabular data, in accordance with some embodiments of the present disclosure.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Conventional end-to-end neural network based techniques for generating a textual summary from a structured data present in tables (herein after referred as a 'tabular data') have focused on learning explicit entity specific representations and updating these representations dynamically during textual summary generation. Further, the conventional end-to-end neural network based techniques may work well when the entities present in the tables are limited and vast amount of training data is available. Also, the conventional end-to-end neural network based techniques may not be effective for unseen entities during actual testing. Additionally, some of the other limitations of the conventional end-to-end neural network based techniques include:

(i) Treating the tabular data as plain text chunks i.e. no explicit representation of numeric values of the entities. Hence, the conventional techniques may not generalize well on unseen entities.

(ii) Not utilizing structure of the tabular data which leads to loss in accuracy. The textual summary generally follows a particular pattern where statistics are reported in a predefined sequence.

(iii) The conventional techniques may be overfit on training data, because of which the generated textual summary deviates from the content selection.

The present disclosure herein provides methods and systems that solves the technical problems of generating the textual summary from the tabular data, by incorporating rank information based on numeric values for different records present in the tabular data. Then, a two-stage encoder-decoder network is used to learn correlations between the rank information and the probability of including the records based on the rank information while generating the textual summary, to obtain the textual summary generation model. The textual summary generation model identifies the content selection having the records present in the tables to be included in the textual summary, based on the rank information and generates the textual summary from the identified content selection.

Figure 1:
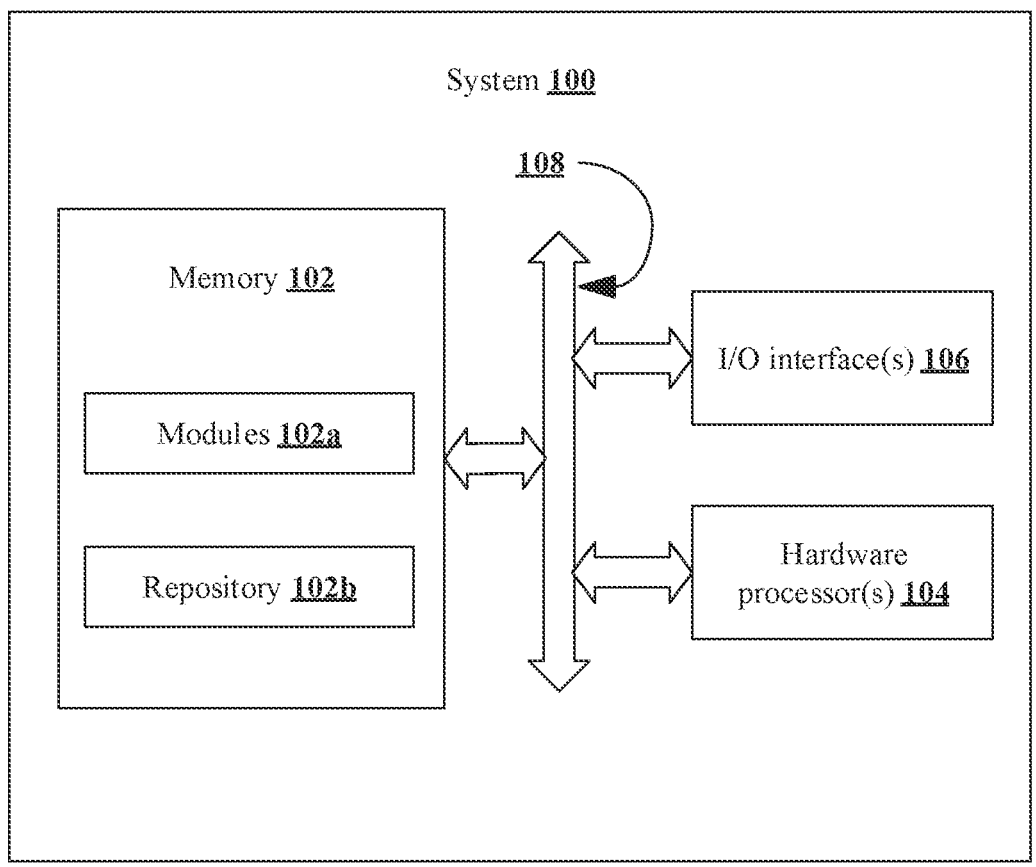
FIG. 1 is an exemplary block diagram of a system for generating a textual summary from a tabular data, in accordance with some embodiments of the present disclosure.
Figure 2B:
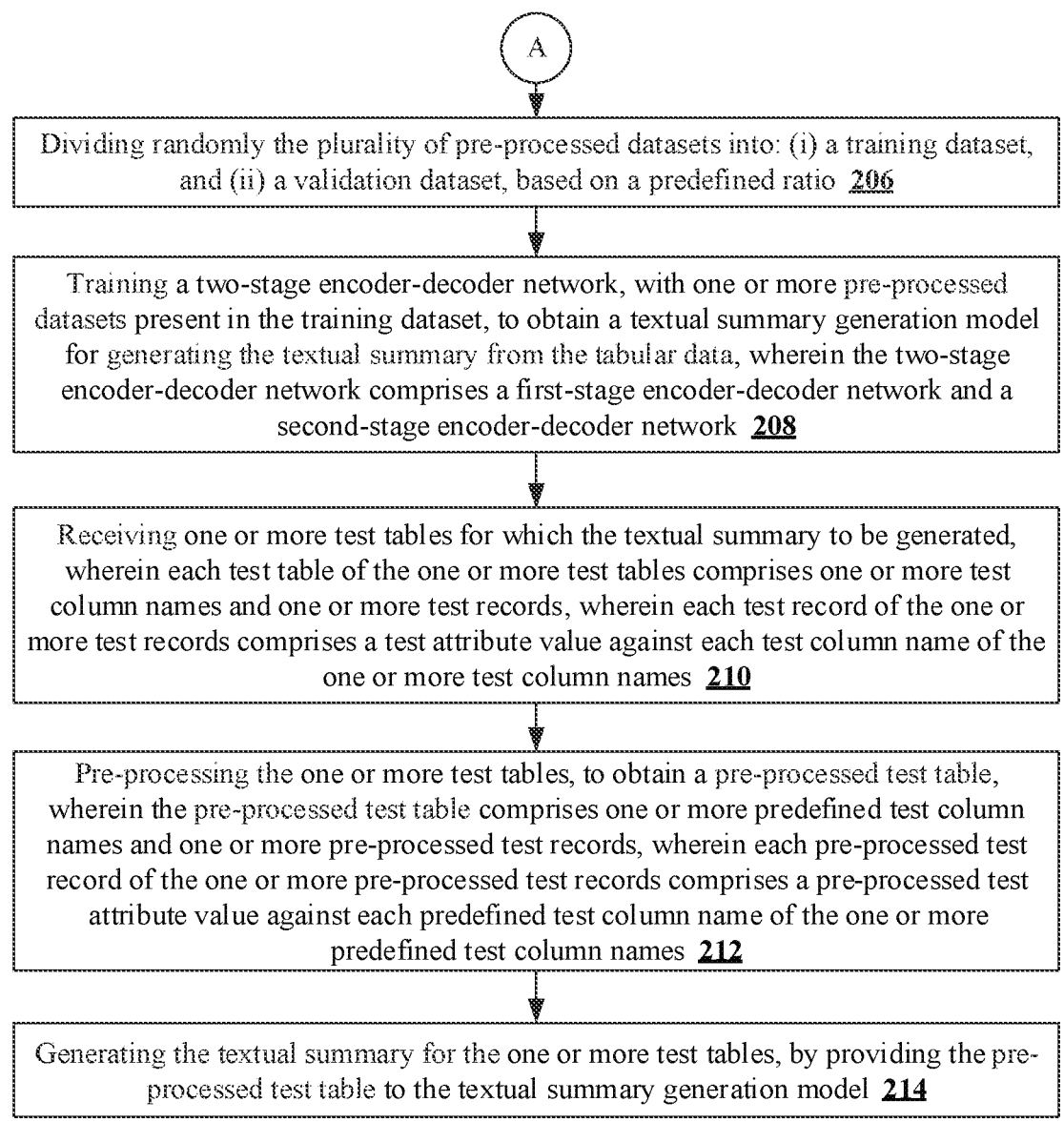
Figure 3:
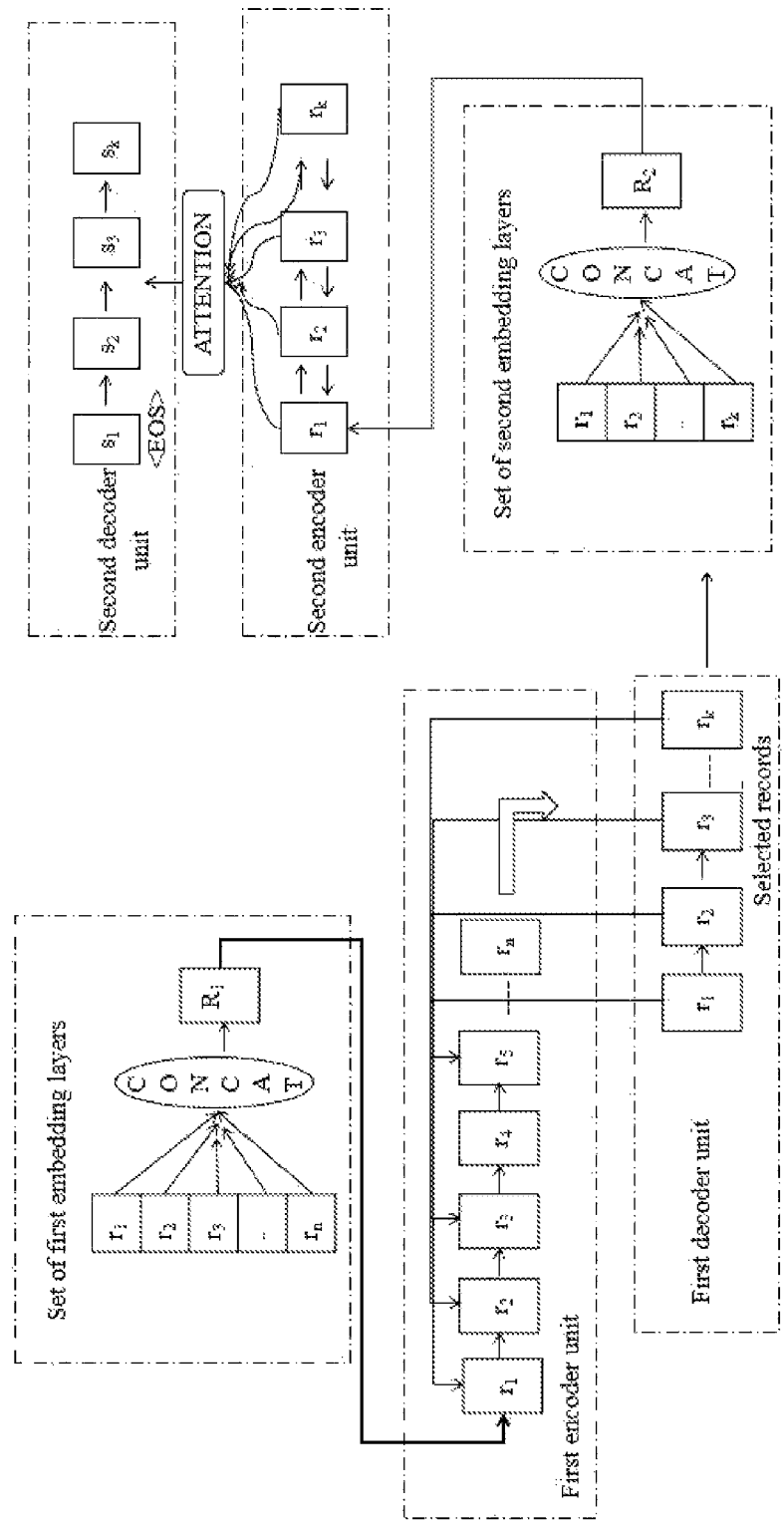
FIG. 3 is a block diagram illustrating an exemplary architecture of two-stage encoder-decoder network for obtaining a textual summary generation model for generating the textual summary from tabular data, in accordance with some embodiments of the present disclosure.

Referring now to the drawings, and more particularly to FIG. 1 through FIG. 3, where similar reference characters denote corresponding features consistently throughout the figures, there are shown preferred embodiments and these embodiments are described in the context of the following exemplary systems and/or methods.

FIG. 1 is an exemplary block diagram of a system 100 for generating the textual summary from the tabular data, in accordance with some embodiments of the present disclosure In an embodiment, the system 100 includes or is otherwise in communication with one or more hardware processors 104, communication interface device(s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102A and a repository 102B for storing data processed, received, and generated by one or more of the plurality of modules 102A. The plurality of modules 102A may include routines, programs, objects, components, data structures, and so on, which perform particular tasks or implement particular abstract data types.

The plurality of modules 102A may include programs or computer-readable instructions or coded instructions that supplement applications or functions performed by the system 100. The plurality of modules 102A may also be used as, signal processor(s), state machine(s), logic circuitries, and/or any other device or component that manipulates signals based on operational instructions. Further, the plurality of modules 102A can be used by hardware, by computer-readable instructions executed by the one or more hardware processors 104, or by a combination thereof. In an embodiment, the plurality of modules 102A can include various sub-modules (not shown in FIG. 1). Further, the memory 102 may include information pertaining to input(s)/output(s) of each step performed by the processor(s) 104 of the system 100 and methods of the present disclosure.

The repository 102B may include a database or a data engine. Further, the repository 102B amongst other things, may serve as a database for storing the data that is processed, received, or generated as a result of the execution of the plurality of modules 102A. Although the repository 102B is shown internal to the system 100, it will be noted that, in alternate embodiments, the repository 102B can also be implemented external to the system 100, where the repository 102B may be stored within an external database (not shown in FIG. 1) communicatively coupled to the system 100. The data contained within such external database may be periodically updated. For example, new data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102B may be distributed between the system 100 and the external database.

Referring to FIG. 2A and FIG. 2B, components and functionalities of the system 100 are described in accordance with an example embodiment of the present disclosure. For example, FIG. 2A and FIG. 2B illustrate exemplary flow diagrams of a processor-implemented method 200 for generating the textual summary from the tabular data, in accordance with some embodiments of the present disclosure. Although steps of the method 200 including process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously.

At step 202 of the method 200, the one or more hardware processors 104 of the system 100 are configured to receive a plurality of input datasets associated with an event. Each input dataset of the plurality of input datasets include (i) one or more tables and (ii) an input textual summary associated with the one or more input tables. Each input table of the one or more input tables present in each input dataset of the plurality of input datasets comprises one or more column names and one or more records. Each record of the one or more records comprises an attribute value against each column name of the one or more column names. In an embodiment, the one or more input tables may be associated with the event corresponding to an organization, a game, a sport and so on. In an embodiment, the one or more records indicates the tabular data and may include details (for example statistics, outcome, results) associated with the event. The input textual summary associated with the one or more input tables is the textual summary in plain text explaining the one or more tables records present in the one or more tables. In an embodiment, the plurality of input datasets associated with the event may be stored in the repository 102B of the system 100.

For example, an input sample dataset associated with a basketball game (the event) played between two teams is listed below. The input sample dataset includes two sample input tables ST1 and ST2, and a sample textual summary associated with the two sample input tables ST1 and ST2.

The table ST1 includes 6 column names (in header record) and two records (excluding the header record) showing the statistics of the two teams (team names 'Raptors' and '76ers') participated in the basketball game. The table ST2 includes 10 column names (in the header record) and 22 records (excluding the header records) showing the statistics of the 26 players played for the two teams in the basketball game. The sample textual summary associated with the two sample input tables ST1 and ST2 explains highlights of the basketball game, such as which team won by how many points, which team lost by how many points, away or at home, outstanding player of the basketball game, best players and their achievements, and so on.

TABLE ST1

| Team_Name | Team_PTS | Team_City | Team_Reb | Team_AST | H/V |
|---|---|---|---|---|---|
| Raptors | 122 | Toronto | 42 | 22 | HOME |
| 76ers | 95 | Philadelphia | 38 | 28 | AWAY |

TABLE ST2

| Player_Name | FGM | STL | MIN | BLK | AST | REB | H/V | PTS | FGA |
|---|---|---|---|---|---|---|---|---|---|
| Fred_VanVleet | 0 | 0 | 4 | 0 | 0 | 0 | HOME | 0 | 1 |
| Bruno_Caboclo | 0 | 1 | 4 | 0 | 0 | 1 | HOME | 0 | 0 |
| Jakob_Poeltl | 0 | 0 | 4 | 0 | 0 | 1 | HOME | 2 | 0 |
| Norman_Powell | 1 | 1 | 11 | 1 | 3 | 0 | HOME | 5 | 3 |
| Lucas_Nogueira | 1 | 1 | 22 | 1 | 0 | 4 | HOME | 6 | 2 |
| Cory_Joseph | 4 | 1 | 24 | 0 | 2 | 4 | HOME | 8 | 10 |
| Patrick_Patterson | 3 | 2 | 20 | 0 | 1 | 2 | HOME | 8 | 5 |
| DeMarre_Carroll | 4 | 1 | 21 | 2 | 3 | 5 | HOME | 10 | 5 |
| Pascal_Siakam | 4 | 1 | 23 | 1 | 0 | 2 | HOME | 11 | 6 |
| Jonas_Valanciunas | 6 | 1 | 22 | 2 | 0 | 11 | HOME | 12 | 12 |
| DeMar_DeRozan | 4 | 1 | 31 | 1 | 5 | 5 | HOME | 14 | 13 |
| Terrence_Ross | 8 | 0 | 23 | 0 | 0 | 3 | HOME | 22 | 11 |
| Kyle_Lowry | 7 | 1 | 32 | 0 | 8 | 4 | HOME | 24 | 9 |
| Timothe_Luwawu-Cabarrot | 0 | 1 | 9 | 1 | 1 | 1 | AWAY | 0 | 1 |
| Gerald_Henderson | 0 | 0 | 17 | 0 | 2 | 1 | AWAY | 0 | 7 |
| Hollis_Thompson | 1 | 0 | 11 | 0 | 1 | 2 | AWAY | 2 | 3 |
| T.J._McConnell | 2 | 2 | 20 | 1 | 4 | 2 | AWAY | 6 | 3 |
| Dario_Saric | 3 | 0 | 24 | 1 | 4 | 4 | AWAY | 8 | 13 |
| Sergio_Rodriguez | 4 | 2 | 28 | 0 | 7 | 3 | AWAY | 11 | 7 |
| Nik_Stauskas | 4 | 0 | 29 | 0 | 2 | 0 | AWAY | 11 | 9 |
| Richaun_Holmes | 4 | 2 | 23 | 0 | 1 | 9 | AWAY | 11 | 10 |
| Ersan_Ilyasova | 4 | 0 | 23 | 0 | 3 | 6 | AWAY | 11 | 8 |
| Jahlil_Okafor | 7 | 0 | 25 | 1 | 0 | 5 | AWAY | 15 | 14 |
| Robert_Covington | 7 | 2 | 32 | 0 | 2 | 5 | AWAY | 20 | 11 |
| Jerryd_Bayless | N/A | N/A | N/A | N/A | N/A | N/A | AWAY | N/A | N/A |
| Joel_Embiid | N/A | N/A | N/A | N/A | N/A | N/A | AWAY | N/A | N/A |

Note from table ST2 that, first 13 records are associated with details of the team players played for the team 'Raptors' and the next 13 records are associated with details of the team players played for the team '76ers'. From both tables table ST1 and table ST2, cell values present in each table represents the attributes. For example, from table ST1, the cell value 'Raptors' present in first row is the attribute against the column name 'Team Name', the cell value '95' present in second row is the attribute against the column name 'Team PTS', and so on. Similarly, from table ST2, the cell value 'Jakob_Poeltl' present in second row is the attribute against the column name 'Team Player', the cell value 'HOME' present in second row is the attribute against the column name 'H/V', and so on.

The sample textual summary:

The host Toronto Raptors defeated the Philadelphia 76ers, 122-95, at Air Canada Center on Monday. The Raptors came into this game as a monster favorite and they did not leave any doubt with this result. Toronto just continuously piled it on, as they won each quarter by at least four points. The Raptors were lights—out shooting, as they went 55 percent from the field and 68 percent from three—point range. They also held the Sixers to just 42 percent from the field and dominated the defensive rebounding, 34-26. Fastbreak points was a huge difference as well, with Toronto winning that battle, 21-6. Philadelphia (4-14) had to play this game without Joel Embiid (rest) and they clearly did n't have enough to compete with a potent Raptors squad.

Toronto (11-6) left very little doubt in this game who the more superior team is. Kyle Lowry carried the load for the Raptors, accumulating 24 points, four rebounds and eight assists. Terrence Ross was great off the bench, scoring 22 points on 8-of-11 shooting. DeMar DeRozan finished with 14 points, five rebounds and five assists. Jonas Valanciunas recorded a double-double, totaling 12 points and 11 rebounds.

Robert Covington had one of his best games of the season though, tallying 20 points, five rebounds, two assists and two steals on 7-of-11 shooting. Jahlil Okafor got the start for Embiid and finished with 15 points and five rebounds. Sergio Rodriguez, Ersan Ilyasova, Nik Stauskas and Richaun Holmes all finished with 11 points a piece. The Sixers will return to action on Wednesday, when they host the Sacramento Kings for their next game. The Raptors next game will be on Wednesday, when they host the defensively—sound Memphis Grizzlies.

At step 204 of the method 200, the one or more hardware processors 104 of the system 100 are configured to pre-process each input dataset of the plurality of input datasets, to obtain a plurality of pre-processed datasets from the plurality of input datasets. The pre-processed dataset for each input dataset is obtained after pre-processing the associated input dataset of the plurality of the input datasets received at step 202 of the method 200. Each pre-processed dataset obtained from the associated input dataset includes:

(i) a pre-processed input table, and (ii) a pre-processed textual summary table. In an embodiment, the pre-processed datasets for the plurality of input datasets, may be stored in the repository 1028 of the system 100.

The pre-processed input table is obtained based on the one or more input tables present in the associated input dataset. The pre-processed input table includes one or more predefined column names and one or more pre-processed records. The one or more predefined column names associated with each pre-processed input table includes one or more fixed column names and one or more variable column names. The one or more fixed column names includes: (i) value, (ii) entity, (iii) entity type, and (iv) rank. The fixed column name cranky is used to assign a rank for the associated pre-processed record in the pre-processed input table, based on the one or more column names of the one or more input tables present in the associated input dataset, where the key statistical details are present. The one or more variable column names are defined based on the one or more column names of the one or more input tables present in each input dataset of the plurality of input datasets, such that the one or more records present in the one or more input tables of the associated input dataset are covered in the pre-processed input table.

The one or more pre-processed records associated with each pre-processed input table are defined based on the one or more records of the one or more input tables present in the associated input dataset. More specifically, each pre-processed record of the one or more pre-processed records present in the pre-processed input table includes a pre-processed attribute value against each predefined column name of the one or more predefined column names. The pre-processed attribute value refers to the cell values present in the pre-processed input table and obtained from the attribute values of the one or more input tables present in the associated input dataset.

In an embodiment, a python script is programmed to parse the tabular data of the one or more input tables present in the input dataset into the pre-processed input table. The tabular data of the one or more input tables is represented as JSON files (JSON format) and then the programmed python script is used to parse the JSON files in to the pre-processed input table having the predefined column names includes: (i) value, (ii) entity, (iii) entity type, (iv) H/V, and (iv) rank. Then, the additional column name 'rank' is introduced pre-processed input table.

The predefined column name 'entity; refers to either team name or player name, the predefined column name 'entity type' refers to the type of the entity and value refers to value associated with the entity type. For example, for the entity 'Kyle Lowry', the entity type is 'PTS' and value is 30. Likewise, the tabular data of the one or more input tables present in the input dataset is transformed. Textual embeddings cannot reliably encode information about numeric concepts and relationships. Moreover, since every numeric value has a unique embedding, generalizing to unseen numeric values in test data becomes challenging. To overcome these challenges, the predefined column name 'rank' is introduced based on the value for all the entities. The rank is calculated for each entity based on the value.

Table 1 shows a sample pre-processed table obtained from the two sample input tables table ST1 and table ST2 mentioned at step 202 of the method 200. The sample pre-processed table includes 5 predefined column names and 28 pre-processed records. Among the 5 predefined column names, the predefined column names: 'value', 'entity', 'entity type', and 'rank' are the fixed column names, and the predefined column name 'H/V' is the variable column name. Note that the predefined column name 'H/V' is chosen such that most of the important tabular data from the two sample input tables table ST1 and table ST2 is covered in the sample pre-processed table.

The predefined column names 'value', 'entity', 'entity type', are defined based on the column names, mainly 'team name', 'team points', 'player name' and 'player points', present in the two sample input tables table ST1 and table ST2. The predefined column name 'entity' covers mainly the subjects such as "team name' and 'player name'. The predefined column name 'value' defines a value for the predefined column name 'entity type' associated with the predefined column name 'entity'. For example, from the first record of the sample pre-processed table, 122 mentioned under 'value' indicate Team_PTS (team points) mentioned under 'entity type' for the team name 'raptors' mentioned under 'entity'. The predefined column name 'rank' is a numeric value starts from '1' indicating highest rank. The rank is assigned to each pre-processed record based on a predefined order such as team won, team lost, best players from winning team and best players from losing team. Basically the 28 pre-processed records show highlights of the basketball game that should be present in the textual summary. In other words, the textual summary may be represented based on the predefined order and based on the associated rank.

TABLE 1

| Index | Value | Entity | Entity Type | H/V | Rank |
|---|---|---|---|---|---|
| 1 | 122 | Raptors | Team_PTS | HOME | 1 |
| 2 | Toronto | Raptors | Team_City | HOME | 1 |
| 3 | 95 | 76ers | Team_PTS | AWAY | 2 |
| 4 | Philadelphia | 76ers | Team_City | AWAY | 2 |
| 5 | 24 | Kyle_Lowry | PTS | HOME | 1 |
| 6 | 4 | Kyle_Lowry | REB | HOME | 1 |
| 7 | 8 | Kyle_Lowry | AST | HOME | 1 |
| 8 | 22 | Terrence_Ross | PTS | HOME | 2 |
| 9 | 3 | Terrence_Ross | REB | HOME | 2 |
| 10 | 0 | Terrence_Ross | AST | HOME | 2 |
| 11 | 15 | DeMar_DeRozan | PTS | HOME | 3 |
| 12 | 5 | DeMar_DeRozan | REB | HOME | 3 |
| 13 | 5 | DeMar_DeRozan | AST | HOME | 3 |
| 14 | 12 | Jonas_Valanciunas | PTS | HOME | 4 |
| 15 | 11 | Jonas_Valanciunas | REB | HOME | 4 |
| 16 | 0 | Jonas_Valanciunas | AST | HOME | 4 |
| 17 | 20 | Robert_Covington | PTS | AWAY | 1 |
| 18 | 5 | Robert_Covington | REB | AWAY | 1 |
| 19 | 2 | Robert_Covington | AST | AWAY | 1 |
| 20 | 15 | Jahlil_Okafor | PTS | AWAY | 2 |
| 21 | 5 | Jahlil_Okafor | REB | AWAY | 2 |
| 22 | 0 | Jahlil_Okafor | AST | AWAY | 2 |
| 23 | 11 | Ersan_Ilyasova | PTS | AWAY | 3 |
| 24 | 6 | Ersan_Ilyasova | REB | AWAY | 3 |
| 25 | 3 | Ersan_Ilyasova | AST | AWAY | 3 |
| 26 | 11 | Nik_Stauskas | PTS | AWAY | 4 |
| 27 | 0 | Nik_Stauskas | REB | AWAY | 4 |
| 28 | 2 | Nik_Stauskas | AST | AWAY | 4 |

Each pre-processed textual summary table is obtained based on the input textual summary present in the associated input dataset, received at step 202 of the method 200. The pre-processed textual summary table includes one or more predefined textual summary column names and one or more textual summary records. The one or more predefined textual summary column names associated with each pre-processed textual summary table are selected from the one or more predefined column names present in the pre-processed input table of the corresponding pre-processed dataset. More specifically, the one or more predefined textual summary column names associated with each pre-processed textual summary table are the one or more fixed column names and the one or more variable column names present in the pre-processed input table, except the fixed column name 'rank'.

The pre-processed textual summary table for the input textual summary present in each input dataset of the plurality of input datasets is obtained by using a feature extraction technique. The feature extraction technique includes a pre-trained information extraction model, to extract features indicating one or more facts present in the associated textual summary. The pre-trained information extraction model identifies candidate entity (i.e., player, team, and city) and value (i.e., number or string) pairs that appear in the textual summary, and then predicts the type (aka relation) of each candidate pair in each sentence. For instance, from the sample textual summary, the pre-trained information extraction model may identify the pair "Kyle_Lowry, 24" and then predict that that their relation is "PTS", extracting the record (Kyle_Lowry, 24, PTS). Likewise, the pre-trained information extraction model transforms each potential sentence in the textual summary having the entity-value pair as a textual summary records and produces the textual summary table. Table 2 shows a sample textual summary table obtained from the sample textual summary mentioned at step 202 of the method 200.

TABLE 2

| Value | Entity | Entity Type | H/V |
|---|---|---|---|
| Toronto | Raptors | Team_City | HOME |
| 122 | Raptors | Team_PTS | HOME |
| Philadelphia | 76ers | Team_City | AWAY |
| 95 | 76ers | Team_PTS | AWAY |
| 4 | 76ers | Team_Wins | AWAY |
| 14 | 76ers | Team_Losses | AWAY |
| 24 | Kyle_Lowry | PTS | HOME |
| 4 | Kyle_Lowry | REB | HOME |
| 8 | Kyle_Lowry | AST | HOME |
| 22 | Terrence_Ross | PTS | HOME |
| 14 | DeMar_DeRozan | PTS | HOME |
| 5 | DeMar_DeRozan | REB | HOME |
| 5 | DeMar_DeRozan | AST | HOME |
| 12 | Jonas_Valancinuas | PTS | HOME |
| 11 | Jonas_Valancinuas | REB | HOME |
| 20 | Robert_Covington | PTS | AWAY |
| 5 | Robert_Covington | REB | AWAY |
| 2 | Robert_Covington | AST | AWAY |
| 2 | Robert_Covington | STL | AWAY |
| 15 | Jahlil_Okafor | PTS | AWAY |
| 5 | Jahlil_Okafor | REB | AWAY |
| 11 | Sergio_Rodriguez | PTS | AWAY |
| 11 | Ersan_Ilyasova | PTS | AWAY |
| 11 | Nik_Stauskas | PTS | HOME |
| 11 | Richaun_Holmes | PTS | AWAY |

At step 206 of the method 200, the one or more hardware processors 104 of the system 100 are configured to divide randomly, the plurality of pre-processed datasets obtained at step 204 of the method 200, into: (i) a training dataset, and (ii) a validation dataset, based on a predefined ratio. In an embodiment, the predefined ratio may be 80%:20%. For example, if a number of the plurality of pre-processed datasets is 100 and the predefined ratio is 80%:20%, then the number of pre-processed datasets present in the training dataset is 80, and the number of pre-processed datasets present in the validation dataset is 20.

At step 208 of the method 200, the one or more hardware processors 104 of the system 100 are configured to train a two-stage encoder-decoder network, with one or more pre-processed datasets present in the training dataset, to obtain a textual summary generation model for generating the textual summary from the tabular data. The two-stage encoder-decoder network includes a first-stage encoder-decoder network and a second-stage encoder-decoder network. The first-stage encoder-decoder network is a Bi-LSTM (Long short-term memory) based network and the second-stage encoder-decoder network is a LSTM based network.

The first-stage encoder-decoder network includes a set of first embedding layers, a first encoder unit and a first decoder unit with a pointer attention mechanism. The set of first embedding layers includes a number of the first embedding layers which depends on the number of the one or more predefined column names present in the pre-processed input table. If the number of the one or more predefined column names present in the pre-processed input table is 5, then the first-stage encoder-decoder network includes 5 first embedding layers.

The second-stage encoder-decoder network includes a set of second embedding layers, a second encoder unit and a second decoder unit with the pointer attention mechanism. The set of second embedding layers includes a number of the second embedding layers which depends on the number of the first embedding layers present in the first-stage encoder-decoder network. If the first-stage encoder-decoder network has 'n' number of the first embedding layers, then the second-stage encoder-decoder network has 'n−1' number of the second embedding layers. For example, if the first-stage encoder-decoder network has '5' number of the first embedding layers, then the second-stage encoder-decoder network has '4' number of the second embedding layers. FIG. 3 is a block diagram illustrating an exemplary architecture of the two-stage encoder-decoder network for obtaining the textual summary generation model for generating the textual summary from tabular data, in accordance with some embodiments of the present disclosure.

The two-stage encoder-decoder network is trained with (i) the pre-processed input table, and (ii) the pre-processed textual summary table, that are present in each pre-processed dataset, at a time, until the one or more pre-processed datasets present in the training dataset are completed, to obtain the textual summary generation model. Broadly, the first-stage encoder-decoder network takes the pre-processed input table and the pre-processed textual summary table, present in each pre-processed dataset, as an input and produces the content selection and ordering as an output. The content selection and ordering represent selecting a subset of pre-processing records out of the one or more pre-processed records present in the pre-processed input table in an ordered sequence. The subset of pre-processing records is selected by calculating a probability of including each pre-processing record from the pre-processed input table, based on its presence in the one or more textual summary records present in the pre-processed textual summary table. Hence, the pre-processing records from the one or more pre-processed records are learned based on the associated probabilities by the first-stage encoder-decoder network and model weights of the first-stage encoder-decoder network are back propagated.

The second-stage encoder-decoder network takes the selected subset of processed records in the ordered sequence by the first-stage encoder-decoder network and generates the predicted textual summary for the associated pre-processed datasets. The training of the two-stage encoder-decoder network with (i) the pre-processed input table, and (ii) the pre-processed textual summary table, that are present in one pre-processed dataset is explained in detail in the below steps.

Before the training process, the model weights of the first-stage encoder-decoder network and the second-stage encoder-decoder network are initialized. A first feature vector for each pre-processed record ($r_1, r_2, r_3, \ldots, r_n$ from FIG. 3) is generated to obtain one or more first feature vectors for the one or more pre-processed records ($r_1, r_2, r_3, \ldots, r_n$ from FIG. 3) present in the pre-processed input table, using the set of first embedding layers of the first-stage encoder-decoder network. The first feature vector for each pre-processed record ($r_1, r_2, r_3, \ldots, r_n$ from FIG. 3) includes one or more embedding features wherein each embedding feature of the one or more embedding features is associated with a pair of: (i) the predefined column name out of the one or more predefined column names, and (ii) the pre-processed attribute value present in the pre-processed record against the predefined column name.

For example, the sample pre-processed table shown in table 1, the first feature vector of the first pre-processed record includes embedding features of column name-attribute pairs: [(Value, 122), (Entity, Raptors), (Entity Type, Team_PTS), (H/V, HOME), (Rank, 1). Likewise, the one or more first feature vectors are generated from the one or more pre-processed records present in the associated pre-processed input table. Then the one or more first feature vectors are concatenated to obtain a first concatenated vector $R_1$ of the pre-processed input table. The concatenated vector $R_1$ may be represented in terms of an expression as:

$$R_1 = (W_r(r_1, r_2, r_3, \ldots, r_n))$$

where n indicates number of one or more pre-processed records present the associated pre-processed input table.

The first concatenated feature vector $R_1$ of the pre-processed input table is provided as the input to the first encoder of the first-stage encoder-decoder network. The first encoder of the first-stage encoder-decoder network learns the embedded features present in the first concatenated vector $R_1$ and outputs a first context vector of the pre-processed input table.

The first context vector of the pre-processed input table is provided as the input to the first decoder with the pointer attention mechanism of the first-stage encoder-decoder network. The first decoder with the pointer attention mechanism generates the one or more ordered indices that represents the subset of pre-processed records ($r_1, r_2, r_3, \ldots, r_k$ from FIG. 3) out of the one or more pre-processed records ($r_1, r_2, r_3, \ldots, r_n$ from FIG. 3) present in the pre-processed input table, that (i.e., the subset of pre-processed records) are matching with the one or more textual summary records present in the pre-processed textual summary table, based on the order.

The pointer-based network that points the subset of pre-processed records ($r_1, r_2, r_3, \ldots, r_k$ from FIG. 3) of the pre-processed input table that are present in the pre-processed textual summary table, by assigning a unique index starting from '1' to each pre-processed record ($r_1, r_2, r_3, \ldots, r_k$ from FIG. 3). Indexes of the subset of pre-processed records ($r_1, r_2, r_3, \ldots, r_k$ from FIG. 3) of the pre-processed input table that are present in the pre-processed textual summary table are captured to obtain a set of indices. The set of indices are ordered based on the fixed column name 'rank' (from highest rank to the lowest rank) to obtain the set of ordered indices. A subset of pre-processed records is then extracted from the one or more pre-processed records ($r_1, r_2, r_3, \ldots, r_n$ from FIG. 3) of the pre-processed input table, based on the indexes present in the set of ordered indices. The subset of pre-processed records ($r_1, r_2, r_3, \ldots, r_k$ from FIG. 3) in the order forms the content selection that need to be captured in the textual summary.

A loss function mentioned in equation 1 is defined for the first-stage encoder-decoder network which is to maximize log likelihood of the subset of pre-processed records ($r_1, r_2, r_3, \ldots, r_k$ from FIG. 3) being the one or more textual summary records present in the pre-processed textual summary table ($y \in D$, where y indicates each textual summary record present in the pre-processed textual summary table D). From equation 1, log p(y|r) indicate the probability of the pre-processed record r being the textual summary record y.

$$\text{Loss function} = \max \Sigma_{r,y \in D} \log p(y|r) \quad (1)$$

The indices of the one or more pre-processed records ($r_1, r_2, r_3, \ldots, r_n$ from FIG. 3) are compared against the indices (An unique index is assigned to each textual summary record) of the one or more textual summary records present in the textual summary table, using the loss function to generate the subset of pre-processed records ($r_1, r_2, r_3, \ldots, r_k$ from FIG. 3) of the pre-processed input table, that are similar to the one or more textual summary records present in the textual summary table.

Table 3 shows a sample sub-set of processed records that are obtained by the first-stage encoder-decoder network from the sample pre-processed table (table 1) and the sample textual summary table (table 2):

TABLE 3

| Value | Entity | Entity Type | HN |
|---|---|---|---|
| Toronto | Raptors | Team_City | HOME |
| 122 | Raptors | Team_PTS | HOME |
| Philadelphia | 76ers | Team_City | AWAY |
| 95 | 76ers | Team_PTS | AWAY |
| 4 | 76ers | Team_Wins | AWAY |
| 14 | 76ers | Team_Losses | AWAY |
| 24 | Kyle_Lowry | PTS | HOME |
| 4 | Kyle_Lowry | REB | HOME |
| 8 | Kyle_Lowry | AST | HOME |
| 22 | Terrence_Ross | PTS | HOME |
| 14 | DeMar_DeRozan | PTS | HOME |
| 5 | DeMar_DeRozan | REB | HOME |
| 5 | DeMar_DeRozan | AST | HOME |
| 12 | Jonas_Valancinuas | PTS | HOME |
| 11 | Jonas_Valancinuas | REB | HOME |
| 20 | Robert_Covington | PTS | AWAY |
| 5 | Robert_Covington | REB | AWAY |
| 2 | Robert_Covington | AST | AWAY |
| 2 | Robert_Covington | STL | AWAY |
| 15 | Jahlil_Okafor | PTS | AWAY |
| 5 | Jahlil_Okafor | REB | AWAY |
| 11 | Sergio_Rodriguez | PTS | AWAY |
| 11 | Ersan_Ilyasova | PTS | AWAY |
| 11 | Nik_Stauskas | PTS | HOME |
| 11 | Richaun_Holmes | PTS | AWAY |

A second feature vector for each pre-processed record present in the subset of pre-processed records ($r_1, r_2, r_3, \ldots, r_k$ from FIG. 3), is generated to obtain a subset of second feature vectors for the subset of pre-processed records obtained from the first decoder with the pointer attention mechanism of the first-stage encoder-decoder network, using a set of second embedding layers of the second-stage encoder-decoder network. The second feature vector for each pre-processed record includes one or more embedding features. Each embedding feature of the one or more embedding features is associated with the pair of: (i) the predefined column name out of the one or more predefined column names and (ii) the pre-processed attribute value present in each pre-processed record of the subset of pre-processed records ($r_1, r_2, r_3, \ldots, r_k$ from FIG. 3), against the predefined column name.

The subset of second feature vectors for the subset of pre-processed records are concatenated, to obtain a second concatenated feature vector $R_2$ of the subset of pre-processed records. Then, the second concatenated feature vector $R_2$ of the subset of pre-processed records is provided as the input to the second encoder of the second-stage encoder-decoder network. The second encoder leans the embedding features present in the second concatenated feature vector $R_2$ and generates a second context vector for the subset of pre-processed records. The second context vector for the subset of pre-processed records is then provided as the input to the second decoder with the pointer attention mechanism, to generate the textual summary, using (i) a natural language processing technique, and (ii) a copy generation mechanism. The pointer attention mechanism of the second decoder points the indexes of the subset of pre-processed records based on the second context vector and the copy generation mechanism is used to copy the subset of pre-processed records. The natural language processing technique is used to generate the predicted textual summary using the subset of pre-processed records.

The model weights of the first-stage encoder-decoder network and the second-stage encoder-decoder network are updated through the back propagation, after training with each pre-processed datasets present in the training dataset. The textual summary generation model is generated after training the two-stage encoder-decoder network, with the one or more pre-processed datasets present in the training dataset, is completed and after updating the model weights.

The one or more hardware processors 104 of the system 100 are further configured to validate the textual summary generation model obtained at step 308 of the method 300, with each pre-processed dataset of the one or more pre-processed datasets present in the validation dataset, at a time. During the validation, for each pre-processed dataset, the pre-processed input table and the pre-processed textual summary table are provided as in input to the textual summary generation model to predict the textual summary. The predicted textual summary is compared against the corresponding input textual summary present in the input dataset (at step 202 of the method 200), to check the accuracy of the prediction and the model weights of the first-stage encoder-decoder network and the second-stage encoder-decoder network are finetuned.

At step 210 of the method 200, the one or more hardware processors 104 of the system 100 are configured to receive one or more test tables, for which the textual summary to be generated. The one or more test tables are associated with the event such as the football game, cricket match, student performance in class, and so on. Each test table of the one or more test tables comprises one or more test column names and one or more test records. Each test record of the one or more test records includes a test attribute value against each test column name of the one or more test column names. The test attribute values represent the cell values present in the test table against the corresponding test column.

At step 212 of the method 200, the one or more hardware processors 104 of the system 100 are configured to pre-process the one or more test tables, to obtain a pre-processed test table, using the same mechanism specified at step 204 of the method. The pre-processed test table includes one or more predefined test column names and one or more pre-processed test records. The one or more predefined test column names are the column names (the one or more fixed column names and the one or more variable column names, including: (i) value, (ii) entity, (iii) entity type, (iv) H/V, and (v) rank) seen during training of the two-stage encoder-decoder network to obtain the textual summary generation model. Each pre-processed test record of the one or more pre-processed test records comprises a pre-processed test attribute value against each predefined test column name of the one or more predefined test column names. The pre-processed test attribute value refers to the cell values present in the pre-processed test table and obtained from the attribute values of the one or more test tables received at step 210 of the method 200.

At step 214 of the method 200, the one or more hardware processors 104 of the system 100 are configured to generate the textual summary for the one or more test tables, by providing the pre-processed test table to the textual summary generation model. The textual summary generation model after validation is used to generate the textual summary for the one or more test tables. The first-stage encoder-decoder network of the textual summary generation model generates the structured ordered content selection in the form of the subset of pre-processed test records out of the one or more pre-processed test records, from the pre-processed test table, based on the the rank information (the predefined test column name 'rank'). Then, the second-stage encoder-decoder network of textual summary generation model generates the textual summary from the structured ordered content selection, using the natural language processing technique.

The methods and systems of the present disclosure for generating the textual summary from the tabular data, effectively and efficiently generates the textual summary using the textual summary generation model. The textual summary generation model learns the facts during the training from the pre-processed input table instead of the actual tables present in the input dataset. The pre-processed input table is obtained by leveraging the additional information in the form of the rank information (the predefined test column name 'rank'), based on the entity which helps in capturing the numeracy. Further the one or more pre-processed records present in the pre-processed input table are ordered based on the rank before feeding into the first-stage encoder-decoder network to capture the positional relationships.

The textual summary generation model is the end-to-end neural network-based model and hence manual intervention is avoided. The textual summary generation model generates the ordered content selection independent of the entity and utilizes the rank information for the numeric data present in the tables. Hence, the textual summary generation model of the present disclosure effectively generates the textual summary with the numeric information (statistical information) even for the unseen data. The methods and systems of the present disclosure may be used in various applications for generating the textual summary from the tabular data associating with the event corresponding to an organization, a game, a sport, students performance in the class, and so on, where the statistical information is present.

Example Scenario:

A Rotowire dataset including about 4850 datasets associated with basketball game statistical information is experimented to evaluate the textual summary generation model. Each dataset of the 4850 datasets include a statistical table paired with journalistic descriptions of the game. The journalistic descriptions are professionally written and with an average 337 words and a vocabulary size of 11.3K. There are 39 different column names, and the average number of records in a single table is 628. Entities are considered as either the team or the player, and player descriptions depend on their involvement in the game. The 4850 datasets is divided into the training dataset, the validation dataset and the testing dataset with a proportion of 3398:727:728 respectively. The textual summary generation model is implemented in OpenNMT-py with learning rate of 0.17, a dropout rate of 0.3 and batch size of 10.

The textual summary generation model of the present disclosure is compared with state-of-the-art approaches: (i) Wiseman (Sam Wiseman, Stuart Shieber, and Alexander Rush. 2017. Challenges in Datato—Document Generation. In Proceedings of the 2017 Conference on Empirical Methods in Natural Language Processing. Association for Computational Linguistics, Copenhagen, Denmark, 2253-2263), (ii) Pudupully-plan (Ratish Puduppully, Li Dong, and Mirella Lapata. 2019. Data-to-text Generation with Entity Modeling. In ACL.), (iii) Pudupully-ent (Ratish Puduppully, Li Dong, and Mirella Lapata. 2019. Data-to-text Generation with Entity Modeling. In Proceedings of the 57th Annual Meeting of the Association for Computational Linguistics. Association for Computational Linguistics, Florence, Italy, 2023-2035.), and (iv) Hierarchical-k (Clément Rebuffel, Laure Soulier, Geoffrey Scoutheeten, and Patrick Gallinari. 2019. A Hierarchical Model for Data-to-Text Generation). Table 4 shows the evaluation of the textual summary generation model of the present disclosure with the testing data, against the state-of-the-art approaches.

TABLE 4

| Approaches | RG | | CS | | CO | BLEU |
| --- | --- | --- | --- | --- | --- | --- |
| | P % | R % | P % | R % | | |
| Wiseman | 75.62 | 16.83 | 32.8 | 39.93 | 15.62 | 14.5 |
| Pudupully-plan | 87.47 | 34.28 | 34.18 | 51.22 | 18.58 | 16.5 |
| Pudupully-ent | 92.69 | 30.11 | 38.64 | 48.51 | 20.17 | 16.2 |
| Hierarchical-k | 89.46 | 21.17 | 39.47 | 51.64 | 18.9 | 17.5 |
| Present disclosure | 85.96 | 34.86 | 40.01 | 50.02 | 23.23 | 15.78 |

From table 4, CS indicate a content selection metric which measures how well the generated document matches the ground tooth document in terms of mentioned records. A precision and a recall (denoted respectively CS-P % and CS-R %) of unique relations extracted from textual summary generated by the present disclosure and extracted from textual summary of the ground tooth document, are measured. CO indicate a content ordering metric that analyzes how well the records are ordered. A normalized Damerau-Levenshtein distance between the sequences of records extracted from textual summary generated by the present disclosure and extracted from textual summary of the ground tooth documents, is measured. RG indicate a relation generation metric that estimates how well the model is able to generate text containing factual (i.e., correct) records. The precision and absolute number (denoted respectively RG-P % and RG-#) are measured. CS primarily targets the "what to say" aspect of evaluation, CO targets the "how to say it" aspect, and RG targets both. Note that for CS, CO, RG-% and BLEU metrics, higher is better; which is not true for RG-#. BLEU metric is commonly used as an evaluation metric in text generation tasks. It estimates the correspondence between a machine output and that of a human by computing the number of co-occurrences for ngrams (n $\in$ 1, 2, 3, 4) between the predicted textual summary and the ground truth textual summary.

In accordance with an embodiment of the present disclosure, the methods and systems improving the content selection, precision and content ordering by significant margins, over the state-of-the art approaches. The methods and systems of the present disclosure effectively captures the numeric information available in the table along with the entity information, based on a new field "rank" to order the entities according to their associated numeric values. The present disclosure may be used in various applications where intermediate results are important such as use cases where templatized sentences can be employed. According to the present disclosure, the selected content is ordered based on their importance, by leveraging the domain information about relative entities. According to the present disclosure, the summary generation model is trained without reusing embeddings from the content selection stage. This prevents deviation from the content selection during textual summary generation.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for generating a textual summary from a tabular data, the method comprising the steps of:
    receiving, via one or more hardware processors, a plurality of input datasets associated with an event, wherein each input dataset of the plurality of input datasets comprises (i) one or more input tables, and (ii) an input textual summary associated with the one or more input tables, wherein each input table of the one or more input tables present in each input dataset of the plurality of input datasets comprises one or more column names and one or more records, and wherein each record of the one or more records comprises an attribute value against each column name of the one or more column names;
    pre-processing, via the one or more hardware processors, each input dataset to obtain a plurality of pre-processed datasets from the plurality of input datasets, wherein each pre-processed dataset obtained from the input dataset comprises: (i) a pre-processed input table obtained based on the one or more input tables present in the input dataset, and comprises one or more predefined column names and one or more pre-processed records, wherein each pre-processed record of the one or more pre-processed records comprises a pre-processed attribute value against each predefined column name of the one or more predefined column names, and (ii) a pre-processed textual summary table obtained based on the input textual summary present in the input dataset, and comprises one or more predefined textual summary column names and one or more textual summary records, and wherein each textual summary record of the one or more textual summary records comprises a textual summary attribute value against each predefined textual summary column name of the one or more predefined textual summary column names;
    dividing randomly, via the one or more hardware processors, the plurality of pre-processed datasets into: (i) a training dataset, and (ii) a validation dataset, based on a predefined ratio; and
    training, via the one or more hardware processors, a two-stage encoder-decoder network, with one or more pre-processed datasets present in the training dataset, to obtain a textual summary generation model for generating the textual summary from the tabular data, wherein the two-stage encoder-decoder network comprises a first-stage encoder-decoder network and a second-stage encoder-decoder network.

2. The method of claim 1, further comprising:
    receiving, via the one or more hardware processors, one or more test tables for which the textual summary is to be generated, wherein each test table of the one or more test tables comprises one or more test column names and one or more test records, wherein each test record of the one or more test records comprises a test attribute value against each test column name of the one or more test column names;
    pre-processing, via the one or more hardware processors, the one or more test tables, to obtain a pre-processed test table, wherein the pre-processed test table comprises one or more predefined test column names and one or more pre-processed test records, wherein each pre-processed test record of the one or more pre-processed test records comprises a pre-processed test attribute value against each predefined test column name of the one or more predefined test column names; and
    generating, via the one or more hardware processors, the textual summary for the one or more test tables, by providing the pre-processed test table to the textual summary generation model.

3. The method of claim 1, wherein: (i) the one or more predefined column names associated with each pre-processed input table comprises one or more fixed column names and one or more variable column names, wherein the one or more variable column names are defined based on the one or more column names of the one or more input tables present in each input dataset of the plurality of input datasets, and (ii) the one or more pre-processed records associated with each pre-processed input table are defined based on the one or more records of the one or more input tables present in the associated input dataset.

4. The method of claim 3, wherein the one or more fixed column names comprises: (i) value, (ii) entity, (iii) entity type, and (iv) rank.

5. The method of claim 1, wherein the one or more predefined textual summary column names associated with each pre-processed textual summary table are selected from the one or more predefined column names present in the pre-processed input table of the associated pre-processed dataset.

6. The method of claim 1, wherein the pre-processed textual summary table for the input textual summary present in each input dataset of the plurality of input datasets is obtained by using a feature extraction technique.

7. The method of claim 1, wherein training the two-stage encoder-decoder network, with the one or more pre-processed datasets present in the training dataset, to obtain the textual summary generation model, further comprises:
    performing for each pre-processed dataset at a time, until the one or more pre-processed datasets present in the training dataset are completed:

generating a first feature vector for each pre-processed record to obtain one or more first feature vectors for the one or more pre-processed records present in the pre-processed input table, using a set of first embedding layers of the first-stage encoder-decoder network, wherein the first feature vector for each pre-processed record comprises one or more embedding features wherein each embedding feature of the one or more embedding features is associated with a pair of: (i) the predefined column name out of the one or more predefined column names and (ii) the pre-processed attribute value present in the pre-processed record against the predefined column name;

concatenating the one or more first feature vectors for the one or more pre-processed records of the pre-processed input table, to obtain a first concatenated feature vector of the pre-processed input table;

providing the first concatenated feature vector of the pre-processed input table to a first encoder of the first-stage encoder-decoder network to generate a first context vector of the pre-processed input table;

providing the first context vector of the pre-processed input table, to a first decoder with a pointer attention mechanism of the first-stage encoder-decoder network, to generate one or more ordered indices, based on (i) the pre-processed textual summary table corresponding to the pre-processed dataset, and (ii) a fixed column name out of the one or more fixed column names present in the pre-processed input table, wherein the one or more ordered indices represents a subset of pre-processed records out of the one or more pre-processed records present in the pre-processed input table, that are matching with the one or more textual summary records present in the pre-processed textual summary table, based on an order;

generating a second feature vector for each pre-processed record to obtain a subset of second feature vectors for the subset of pre-processed records obtained from the first decoder with the pointer attention mechanism of the first-stage encoder-decoder network, using a set of second embedding layers of the second-stage encoder-decoder network, wherein the second feature vector for each pre-processed record comprises one or more embedding features wherein each embedding feature of the one or more embedding features is associated with the pair of: (i) the predefined column name out of the one or more predefined column names and (ii) the pre-processed attribute value present in each pre-processed record of the subset of pre-processed records, against the predefined column name;

concatenating the subset of second feature vectors for the subset of pre-processed records, to obtain a second concatenated feature vector of the subset of pre-processed records;

providing the second concatenated feature vector of the subset of pre-processed records to a second encoder of the second-stage encoder-decoder network to generate a second context vector for the subset of pre-processed records; and providing the second context vector for the subset of pre-processed records, to a second decoder network with the pointer attention mechanism of the second-stage encoder-decoder, to generate the textual summary, using (i) a natural language processing technique, and (ii) a copy generation mechanism.

8. The method of claim 1, further comprising: validating the textual summary generation model, with the one or more pre-processed datasets present in the validation dataset, to finetune model weights of the textual summary generation model.

9. A system for generating a textual summary from a tabular data, the system comprising:
a memory storing instructions;
one or more Input/Output (I/O) interfaces; and
one or more hardware processors coupled to the memory via the one or more I/O interfaces, wherein the one or more hardware processors are configured by the instructions to:
receive a plurality of input datasets associated with an event, wherein each input dataset of the plurality of input datasets comprises (i) one or more input tables, and (ii) an input textual summary associated with the one or more input tables, wherein each input table of the one or more input tables present in each input dataset of the plurality of input datasets comprises one or more column names and one or more records, and wherein each record of the one or more records comprises an attribute value against each column name of the one or more column names;
pre-process each input dataset to obtain a plurality of pre-processed datasets from the plurality of input datasets, wherein each pre-processed dataset obtained from the input dataset comprises: (i) a pre-processed input table obtained based on the one or more input tables present in the input dataset, and comprises one or more predefined column names and one or more pre-processed records, wherein each pre-processed record of the one or more pre-processed records comprises a pre-processed attribute value against each predefined column name of the one or more predefined column names, and (ii) a pre-processed textual summary table obtained based on the input textual summary present in the input dataset, and comprises one or more predefined textual summary column names and one or more textual summary records, and wherein each textual summary record of the one or more textual summary records comprises a textual summary attribute value against each predefined textual summary column name of the one or more predefined textual summary column names;
dividing randomly the plurality of pre-processed datasets into: (i) a training dataset, and (ii) a validation dataset, based on a predefined ratio; and
train a two-stage encoder-decoder network, with one or more pre-processed datasets present in the training dataset, to obtain a textual summary generation model for generating the textual summary from the tabular data, wherein the two-stage encoder-decoder network comprises a first-stage encoder-decoder network and a second-stage encoder-decoder network.

10. The system of claim 9, wherein the one or more hardware processors are further configured to:
receive one or more test tables for which the textual summary is to be generated, wherein each test table of the one or more test tables comprises one or more test column names and one or more test records, wherein each test record of the one or more test records comprises a test attribute value against each test column name of the one or more test column names;
pre-process the one or more test tables, to obtain a pre-processed test table, wherein the pre-processed test table comprises one or more predefined test column names and one or more pre-processed test records, wherein each pre-processed test record of the one or more pre-processed test records comprises a pre-processed test attribute value against each predefined test column name of the one or more predefined test column names; and generate the textual summary for the one or more test tables, by providing the pre-processed test table to the textual summary generation model.

11. The system of claim 9, wherein: (i) the one or more predefined column names associated with each pre-processed input table comprises one or more fixed column names and one or more variable column names, wherein the one or more variable column names are defined based on the one or more column names of the one or more input tables present in each input dataset of the plurality of input datasets, and (ii) the one or more pre-processed records associated with each pre-processed input table are defined based on the one or more records of the one or more input tables present in the associated input dataset.

12. The system of claim 11, wherein the one or more fixed column names comprises: (i) value, (ii) entity, (iii) entity type, and (iv) rank.

13. The system of claim 9, wherein the one or more predefined textual summary column names associated with each pre-processed textual summary table are selected from the one or more predefined column names present in the pre-processed input table of the associated pre-processed dataset.

14. The system of claim 9, wherein the one or more hardware processors are further configured to obtain the pre-processed textual summary table for the input textual summary present in each input dataset of the plurality of input datasets, using a feature extraction algorithm.

15. The system of claim 9, wherein the one or more hardware processors are further configured to train the two-stage encoder-decoder network, with the one or more pre-processed datasets present in the training dataset, to obtain the textual summary generation model, by:

performing for each pre-processed dataset at a time, until the one or more pre-processed datasets present in the training dataset are completed:

generating a first feature vector for each pre-processed record to obtain one or more first feature vectors for the one or more pre-processed records present in the pre-processed input table, using a set of first embedding layers of the first-stage encoder-decoder network, wherein the first feature vector for each pre-processed record comprises one or more embedding features wherein each embedding feature of the one or more embedding features is associated with a pair of: (i) the predefined column name out of the one or more predefined column names and (ii) the pre-processed attribute value present in the pre-processed record against the predefined column name;

concatenating the one or more first feature vectors for the one or more pre-processed records of the pre-processed input table, to obtain a first concatenated feature vector of the pre-processed input table;

providing the first concatenated feature vector of the pre-processed input table to a first encoder of the first-stage encoder-decoder network to generate a first context vector of the pre-processed input table;

providing the first context vector of the pre-processed input table, to a first decoder with a pointer attention mechanism of the first-stage encoder-decoder network, to generate one or more ordered indices, based on (i) the pre-processed textual summary table corresponding to the pre-processed dataset, and (ii) a fixed column name out of the one or more fixed column names present in the pre-processed input table, wherein the one or more ordered indices represents a subset of pre-processed records out of the one or more pre-processed records present in the pre-processed input table, that are matching with the one or more textual summary records present in the pre-processed textual summary table, based on an order;

generating a second feature vector for each pre-processed record to obtain a subset of second feature vectors for the subset of pre-processed records obtained from the first decoder with the pointer attention mechanism of the first-stage encoder-decoder network, using a set of second embedding layers of the second-stage encoder-decoder network, wherein the second feature vector for each pre-processed record comprises one or more embedding features wherein each embedding feature of the one or more embedding features is associated with the pair of: (i) the predefined column name out of the one or more predefined column names and (ii) the pre-processed attribute value present in each pre-processed record of the subset of pre-processed records, against the predefined column name;

concatenating the subset of second feature vectors for the subset of pre-processed records, to obtain a second concatenated feature vector of the subset of pre-processed records;

providing the second concatenated feature vector of the subset of pre-processed records to a second encoder of the second-stage encoder-decoder network to generate a second context vector for the subset of pre-processed records; and providing the second context vector for the subset of pre-processed records, to a second decoder network with the pointer attention mechanism of the second-stage encoder-decoder, to generate the textual summary, using (i) a natural language processing technique, and (ii) a copy generation mechanism.

16. The system of claim 9, wherein the one or more hardware processors are further configured to validate the textual summary generation model, with the one or more pre-processed datasets present in the validation dataset, to finetune model weights of the textual summary generation model.

17. A computer program product comprising a non-transitory computer readable medium having a computer readable program embodied therein, wherein the computer readable program, when executed on a computing device, causes the computing device to:

receive a plurality of input datasets associated with an event, wherein each input dataset of the plurality of input datasets comprises (i) one or more input tables, and (ii) an input textual summary associated with the one or more input tables, wherein each input table of the one or more input tables present in each input dataset of the plurality of input datasets comprises one or more column names and one or more records, and wherein each record of the one or more records comprises an attribute value against each column name of the one or more column names;

pre-process each input dataset to obtain a plurality of pre-processed datasets from the plurality of input datasets, wherein each pre-processed dataset obtained from the input dataset comprises: (i) a pre-processed input table obtained based on the one or more input tables present in the input dataset, and comprises one or more predefined column names and one or more pre-processed records, wherein each pre-processed record of the one or more pre-processed records comprises a pre-processed attribute value against each predefined column name of the one or more predefined column names, and (ii) a pre-processed textual summary table obtained based on the input textual summary present in the input dataset, and comprises one or more predefined textual summary column names and one or more textual summary records, and wherein each textual summary record of the one or more textual summary records comprises a textual summary attribute value against each predefined textual summary column name of the one or more predefined textual summary column names;

dividing randomly the plurality of pre-processed datasets into: (i) a training dataset, and (ii) a validation dataset, based on a predefined ratio;

train a two-stage encoder-decoder network, with one or more pre-processed datasets present in the training dataset, to obtain a textual summary generation model for generating the textual summary from the tabular data, wherein the two-stage encoder-decoder network comprises a first-stage encoder-decoder network and a second-stage encoder-decoder network;

validate the textual summary generation model, with the one or more pre-processed datasets present in the validation dataset, to finetune model weights of the textual summary generation model;

receive one or more test tables for which the textual summary is to be generated, wherein each test table of the one or more test tables comprises one or more test column names and one or more test records, wherein each test record of the one or more test records comprises a test attribute value against each test column name of the one or more test column names;

pre-process the one or more test tables, to obtain a pre-processed test table, wherein the pre-processed test table comprises one or more predefined test column names and one or more pre-processed test records, wherein each pre-processed test record of the one or more pre-processed test records comprises a pre-processed test attribute value against each predefined test column name of the one or more predefined test column names; and generate the textual summary for the one or more test tables, by providing the pre-processed test table to the textual summary generation model.

\* \* \* \* \*